United States Patent
Mapes et al.

(10) Patent No.: US 8,365,202 B2
(45) Date of Patent: Jan. 29, 2013

(54) FRAMEWORK FOR COMPUTING DEVICE WITH AUXILIARY DISPLAY

(75) Inventors: Teague Mapes, Woodinville, WA (US); Richard J. Swaney, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1110 days.

(21) Appl. No.: 12/025,352

(22) Filed: Feb. 4, 2008

(65) Prior Publication Data

US 2009/0199215 A1    Aug. 6, 2009

(51) Int. Cl.
*G06F 3/00* (2006.01)
*G06F 9/44* (2006.01)
*G06F 9/46* (2006.01)
*G06F 13/00* (2006.01)

(52) U.S. Cl. ........................................ 719/321
(58) Field of Classification Search .................... 719/321
See application file for complete search history.

(56) References Cited

U.S. PATENT DOCUMENTS

| | | | | |
|---|---|---|---|---|
| 5,459,867 A * | 10/1995 | Adams et al. | .................. | 719/321 |
| 5,655,148 A * | 8/1997 | Richman et al. | .................. | 710/8 |
| 5,680,322 A * | 10/1997 | Shinoda | .................. | 714/18 |
| 6,674,767 B1 * | 1/2004 | Kadyk et al. | .................. | 370/466 |
| 7,188,111 B2 | 3/2007 | Chen et al. | | |
| 2005/0034135 A1 * | 2/2005 | Warwick et al. | .................. | 719/321 |
| 2005/0131999 A1 | 6/2005 | Bolosky et al. | | |
| 2005/0246455 A1 * | 11/2005 | Bhesania et al. | .................. | 710/10 |
| 2006/0176271 A1 | 8/2006 | Polivy et al. | | |
| 2006/0242590 A1 | 10/2006 | Polivy et al. | | |
| 2006/0250320 A1 | 11/2006 | Fuller et al. | | |
| 2007/0198946 A1 | 8/2007 | Viji et al. | | |
| 2007/0226734 A1 | 9/2007 | Lin et al. | | |
| 2008/0154398 A1 * | 6/2008 | Moorer et al. | .................. | 700/90 |

FOREIGN PATENT DOCUMENTS

WO    WO 2007075262 A2    7/2007

OTHER PUBLICATIONS

Egger, M., Unveiling Windows SideShow, http://www.code-magazine.com/Article.aspx?quickid=0512122, downloaded Oct. 22, 2007.
Cadiz, et al., Sideshow: Providing Peripheral Awareness of Important Information, http://www.interruptions.net/literature/Cadiz-tr-2001-83.pdf, Sep. 14, 2001.
Coffee, P., Windows SideShow Surpasses Simple Tricks, http://www.eweek.com/article2/0.1895,1863731,00.asp, Sep. 25, 2005, downloaded Oct. 22, 2007.
Microsoft Corp., Windows Logo Program 3.0, http://download.microsoft.com/download/d/e/1/dele0c8f-a222-47bc-b78b-1656d4cf7/WLP-DeviceReqs_309.pdf, Dec. 22, 2006.

* cited by examiner

*Primary Examiner* — Andy Ho
*Assistant Examiner* — Timothy A Mudrick
(74) *Attorney, Agent, or Firm* — Merchant & Gould P.C.

(57) ABSTRACT

A computer system with an architecture and protocol that facilitate ready integration with an auxiliary display device. The auxiliary display device is coupled to the computer system over a transport, such as Bluetooth, USB or TCP/IP. From an application level gadget, control of the display device is through a programming interface to a platform component. The platform component interfaces with a device driver, which has two components. One component is common and can be used with any auxiliary display device supporting the protocol, regardless of which transport is used. The second component is transport specific. The second component processes data streams representing packets according to the protocol, conveying the packets as data in accordance with the format of the transport. The second component may be simple because it is not required to perform any processing specifically associated with the display functions or protocol.

16 Claims, 6 Drawing Sheets

FRAMEWORK FOR COMPUTING DEVICE WITH AUXILIARY DISPLAY

BACKGROUND

Computing devices have long used displays to present information to users of the devices. In early computers, monitors using cathode ray tubes were used to create displays. The computing device controlled the information on the display by writing information to a display controller, which was inside the computing device. The display controller then generated analog signals to cause the monitor to display the required information.

The display controller was a hardware component connected to the monitor through a cable and interfacing to other components of the computing device over a standardized bus within the computing device. The display controller was controlled by a software component called a display driver. In some instances, the display driver was written for a specific monitor, but in many instances, a display controller could generate required control signals for a monitor using a standard display driver.

More recently, smaller and lower power display devices have been used as computer monitors. For example, TFT and LCD monitors are widely used instead of cathode ray tube monitors. Though implemented with different technology, the basic hardware and software architecture of a computer system using a TFT or LCD monitor is the same as for a computing device using a cathode ray tube monitor.

Smaller and lower power display devices have also enabled other forms of user displays instead of or in addition to traditional computer monitors. Some computing devices incorporate auxiliary displays that may be used to present information to a user on small displays close to a point of use or in ways other than through a traditional monitor. As one example, a laptop computer may be equipped with a auxiliary display on an external surface. Such an auxiliary display can be used to present information to a user when the laptop is closed and the main display is not available.

Auxiliary displays may also be incorporated in devices detached from the core computing device. Printers and keyboards may include auxiliary displays. These auxiliary displays may be used for functions such as displaying "thumbnails" of documents about to be printed or to indicate special functions mapped to keys on the keyboard. Also, devices that can communicate wirelessly with a computing device may have displays that can serve as auxiliary displays for a computing device. For example, a Personal Digital Assistant (PDA) may have a display that can be used as an auxiliary display for a computing device.

Consequently, to communicate with an auxiliary display device, a computing device may need to communicate over any of multiple transports. For example, if the auxiliary display is part of a device that is physically connected to the computing device, that device may communicate with the computing device over a Universal Serial Bus (USB). Alternatively, if the auxiliary display is part of a portable electronic device, that device may communicate with the computing device over a wireless transport, such as Bluetooth.

To aid in the use of auxiliary displays, computing devices may be equipped with a platform that provides a mechanism for application programs to interface with a device containing an auxiliary display. Such a platform may provide some common functions and services useful in communicating with auxiliary display auxiliary display devices. Such a framework may be provided, for example, in some versions of the Microsoft's Windows® Vista® operating system. The framework is referred to as the SideShow framework.

To reduce the complexity of creating drivers for each device controlled through the SideShow framework, that framework uses a known communication framework to enable applications executing on a computing device to send commands to a device with an auxiliary display and receive notifications of events from such a device. As an example, the .NET microframework may be used as a mechanism for a computing device to exchange information with a device with an auxiliary display. However, use of this framework requires firmware customized to the device to enable the .NET framework to execute on the device.

SUMMARY OF INVENTION

To simplify integration of an auxiliary display into a computer system, including a computing device, a framework within the computing device may be provided to facilitate programming of the computing device to interface with the display devices. The framework may interface with application program components executing on the computing device so that those application components may access functions or other services provided by the framework. The framework interacts with a driver that can send or receive display-related information over a transport connecting the computing device and the display device. By accessing the driver through the framework, the application components on the computing device can exchange information with the display device. The exchanged information may include commands to the display device initiated by the application components, event notifications initiated by the display device or responses to such commands or event notifications.

To facilitate interfacing the computing device with multiple types of devices providing auxiliary displays, the driver may include separate components, including a common driver component and a transport-specific driver component. The transport-specific driver portion implements a simple interface that supports a limited number of commands, such as read and write. The common driver component translates between a format used by the framework to represent display-related information and a data stream that may be processed by a simple transport-specific driver.

Because the transport-specific driver implements only a few commands, it may be readily implemented, facilitating use of auxiliary display devices with computing devices within the framework. Extensive functionality for the auxiliary device may be provided, despite this simple interface, through the representation of display-related information as packets. Each packet may represent an interaction between an application component and the auxiliary display device. Packets may be simply converted into data streams for easy transmission by a simple transport-specific driver.

The transport-specific driver passes such data streams between the common driver component and an underlying transport, which can transmit or receive the data stream representing a packet in its native format.

On the auxiliary display device, data streams can likewise be transmitted and received by a transport. An endpoint component on the display device may generate and process such data streams based on a packet protocol defined for communication between application components and the display device. The endpoint may modify its display based on received packets representing commands or generate packets representing responses to those commands or representing events, such as user input. By making the supported packet types and packet formats widely known, auxiliary display devices can readily interfaced to a computing device.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

The inventors have appreciated that a more desirable user experience may be provided for users of computing devices by facilitating the use of auxiliary displays. By providing a simple mechanism for interfacing an auxiliary device with a computing device, independent hardware vendors and computer system manufacturers are more likely to provide auxiliary display devices. Independent Software vendors are more likely to provide application components that provide useful and interesting display functions.

These benefits may be promoted by including in the computing device a platform to provide functions and services for application components that interface to a user through an auxiliary display. The platform may provide an interface to application components, such as gadgets, that interface to a user through an auxiliary display device. The platform may also provide a simple mechanism for auxiliary display devices to interface with the computing device over readily available transports.

Figure 1A:
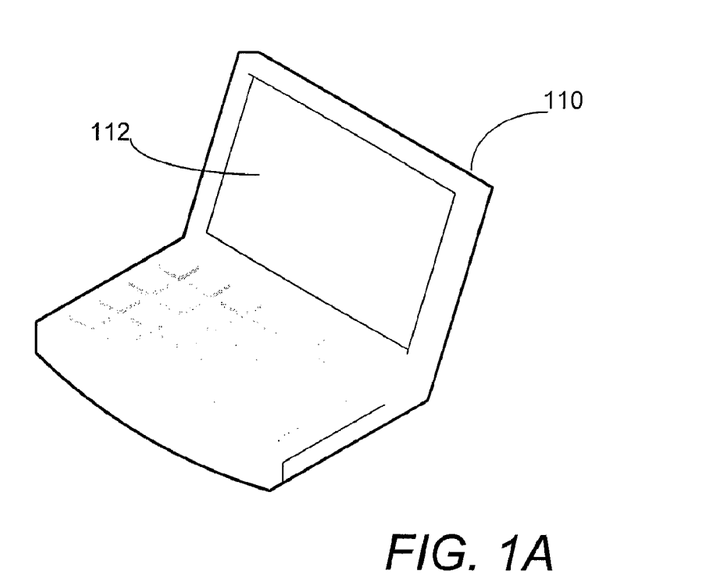
FIG. 1A is a sketch of a computing device that may interface with an auxiliary display according to an embodiment of the invention.

A framework according to embodiments of the invention may be incorporated into any suitable type of computing device. An example of such a computing device is illustrated in FIG. 1A. FIG. 1A illustrates laptop 110. Laptop 110 may be a laptop computer with a display 112 as is known in the art. Such a display may be implemented as a panel made with thin film transistors (TFT) or in any other suitable way.

In the embodiment illustrated, laptop computer 110 has a clamshell design, allowing computer 110 to be placed in an open or closed position. In FIG. 1A, laptop 110 is illustrated in an open position. In the open position, display 112 is visible to a user of laptop 110. Other input/output devices may also be available to the user. For example, a keyboard (not numbered) may be incorporated in laptop 110 and made available to a user viewing display 112 with laptop 110 in the open position.

Figure 1B:
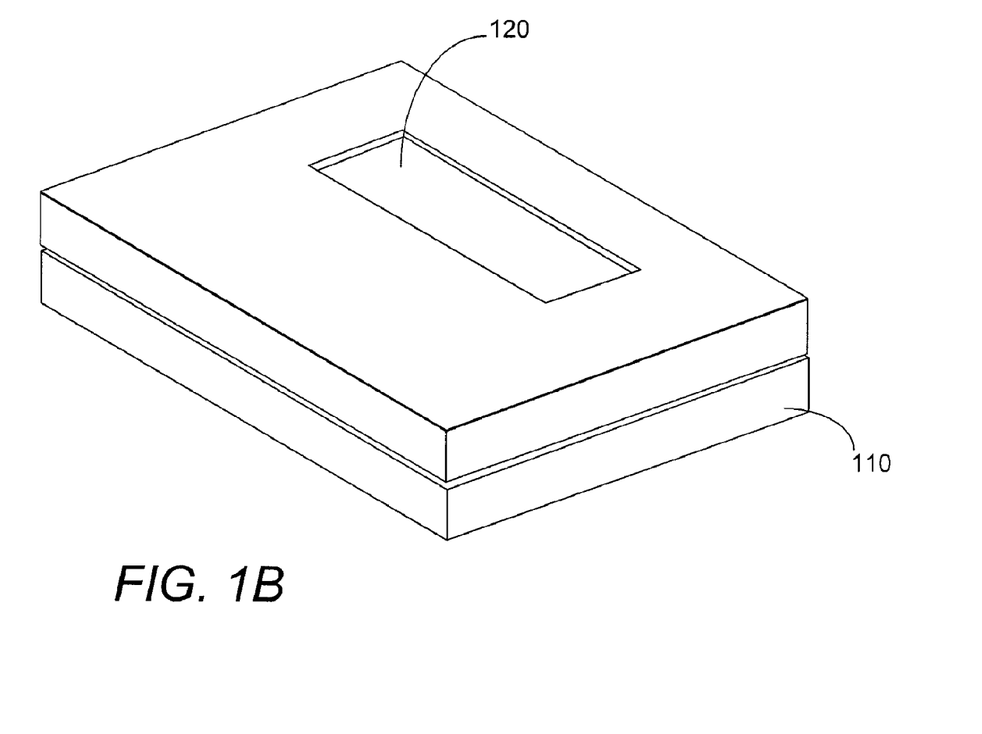
FIG. 1B is a sketch of the computing device of FIG. 1A in an alternative operating configuration.

Laptop 110 also may be placed into a closed configuration, such as for ease of transport by a user. FIG. 1B illustrates a closed configuration of laptop 110. In this configuration, the portion of the case of laptop 110 containing display 112 is folded into the portion of the case containing the keyboard. In this configuration, display 112 is not visible to a user and the input/output devices, such as the keyboard, that may be used in the open configuration are no longer accessible to a user.

In the embodiment illustrated in FIG. 1B, laptop 110 contains an auxiliary display, illustrated as display 120. Display 120 is visible when laptop 110 is in the closed configuration. Display 120 may be used by a processor within computer 110 to present information to a user, even when laptop 110 is in a closed configuration. For example, an application program installed on laptop 110 may maintain a calendar for a user of laptop 110. Such a program may display information on a user's calendar, such as upcoming meetings or scheduled tasks. When laptop 110 is closed, such information may be of interest to a user.

Calendar information is just one example of information that may be presented on display 120. The type of information presented on display 120 is not a limitation on the invention, and any suitable information may be presented. Moreover, an auxiliary display may be positioned in any suitable location. Accordingly, display 120 may be used to display that information when laptop 110 is closed.

Figure 1C:
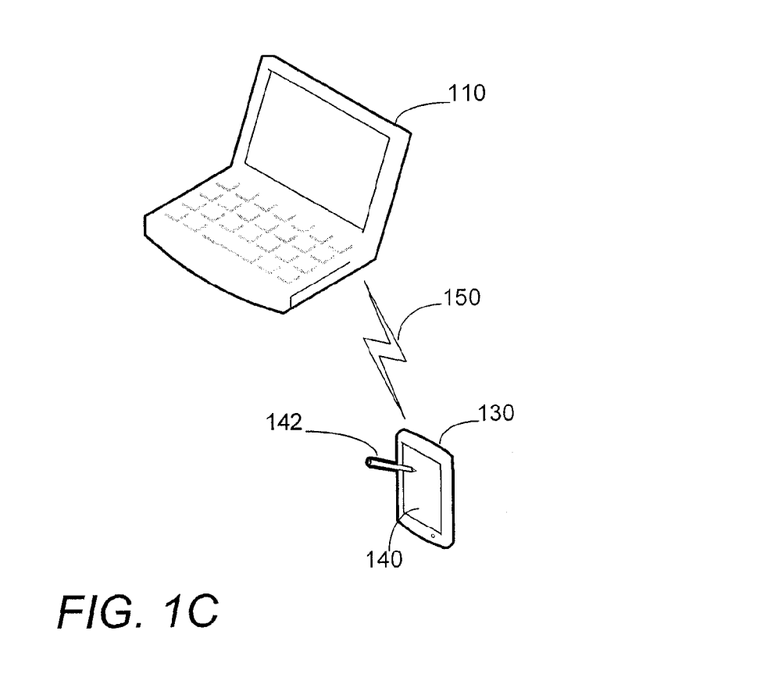
FIG. 1C is a sketch of the computing device of FIG. 1A interfacing with an auxiliary display device according to an alternative embodiment of the invention.

For example, the auxiliary display, though coupled to a processor within laptop computer 110, need not be physically integrated with laptop 110. FIG. 1C illustrates an embodiment in which a display device is separate from laptop 110. In the embodiment of FIG. 1C, a display on a portable electronic device may be used as an auxiliary display for application components executing on laptop 110. In the example illustrated, display 140 on personal digital assistant (PDA) 130 may serve as an auxiliary display for application components on laptop 110. In this example, information is conveyed over a wireless transport 150 that allows application components executing on laptop computer 110 to control display 140. Transport 150 may be any suitable wireless transport, such as Bluetooth. However, the specific transport over which information is conveyed between laptop computer 110 and PDA 130 is not a limitation on the invention, and any suitable wired or wireless transport may be used.

In the embodiment of FIG. IC, display 140 also has an input mechanism associated with it. In this example, a user viewing display 140 may use a stylus 142 to select active objects on display 140 or otherwise provide input. In this example, display 140 includes a touch sensitive screen such that the position at which stylus 142 contacts display 140 signifies an input. Touch sensitive displays and other known input mechanisms may be included in auxiliary display devices. However, any suitable input mechanism may be used.

Regardless of the specific input mechanism used, PDA 130 communicates user input over transport 150 to application components on laptop computer 110. Current computing devices are frequently constructed with one or more transports. For example, laptop computers and other computing devices frequently include network connections for Bluetooth networks, TCP/IP networks and universal serial bus (USB) networks. One or more transports are available in a computing device to connect an auxiliary display device to a processor and the specific transport used is not critical to the invention.

Figure 2:
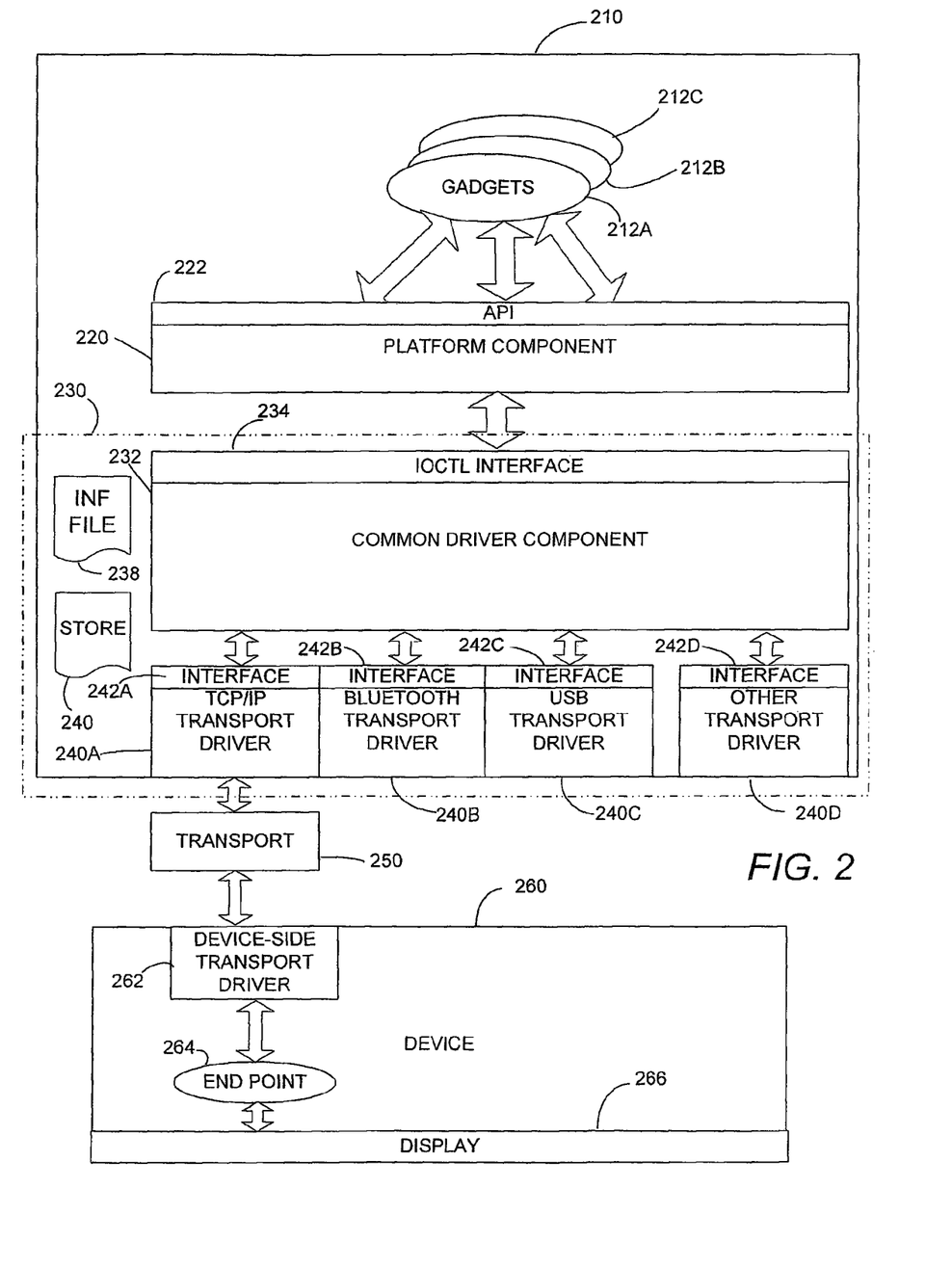
FIG. 2 is a block diagram illustrating the software architecture of a computing device according to an embodiment of the invention.

According to embodiments of the invention, a computing device may be equipped with a software architecture that facilitates use of one of multiple transports to couple an auxiliary display to application components generating information to present to a user on the display or receiving input from the user associated with the display. FIG. 2 illustrates an architecture that supports integration of a display device 260 with a computing device 210 over a transport 250. In the embodiment illustrated, transport 250 is a TCP/IP transport, but the architecture supports Bluetooth, USB and other transports.

Computing device 210 may be any suitable computing device, such as laptop 110, and the specific form of computing device 210 is not critical to the invention. Display device 260 also may be any suitable display device, such as PDA 130. However, it is not necessary that the display device be physically separate from computing device 210, and display device 260 may be a device physically integrated with computing device 210, such as display 120 (FIG. 1B).

In the embodiment illustrated, known components of computing device 210 and display device 260 are not expressly shown for simplicity. In the example of FIG. 2, computing device 210 is not illustrated as having a computer monitor. A computer monitor or other display may be provided in addition to display 266 provided by display device 260. In such an embodiment, display device 260 may display information in addition to that presented on the monitor or other display or may display information only when the other display is not used. However, in some embodiments, display device 260 may provide the only available display for computing device 210. Accordingly, as used herein, an "auxiliary display" signifies a display device coupled to computing device 210 over a transport and does not necessarily indicate that the display is one of multiple displays or of lesser importance than other displays accessible to computing device 210.

FIG. 2 illustrates that computing device 210 contains application components that generate information for presentation on display 266 or that respond to user input or other events reported by display device 260. In the embodiment illustrated, the application components are implemented as gadgets 212A, 212B and 212C. Gadgets are a form of computer software component designed to be readily integrated into a computing device. Gadgets 212A, 212B and 212C may interface with other application programs or other components within computing device 210 to generate information for presentation on display 266 or to respond to notifications representing events reported by display device 260. As one example, one gadget 212A may interface with a calendar program executing on computing device 210 to obtain information representing upcoming appointments and may provide information about an upcoming appointment on display 266. Gadget 212A may receive a notification from display device 260 that a user has provided input relating to an appointment.

However, the specific functions and implementation of the application components that generate information for display and respond to notifications of events are not critical to the invention. Any suitable components performing any suitable functions may be used. Also, FIG. 2 illustrates three application components. The number of application components is also not a limitation on the invention.

Regardless of the form and function of the application components, a mechanism may be provided within the operating system of computing device 210 to convey information from the application components to display device 260 and to convey notifications of events from display device 260 to the application components. In the embodiment illustrated, those operating system components include a platform component 220 and a driver 230. Platform component 220 may be a software component implemented using techniques as is known in the art. In the example illustrated, platform component 220 provides an application programming interface (API) 222 through which gadgets 212A, 212B and 212C may interface with platform component 220. Through API 222, gadgets may send information for display on display 266 and otherwise provide commands that may control the operation of display device 260. Additionally, API 222 provides a mechanism through which gadgets 212A, 212B and 212C may receive notifications of events reported by display device 260 and receive information in response to commands issued by gadgets 212A, 212B and 212C.

The type of commands and event notifications supported by API 222 is not critical to the invention. A specific example illustrating the types of commands and notifications that are supported is provided below. Regardless of the specifics, the collection of commands and notifications defines a protocol with which an application component may interact with an auxiliary display, such as display device 260. According to embodiments of the invention, an operating system vendor may make the protocol supported by API 222 known to application developers. In this way, any independent software vendor (ISV) may provide gadgets that can interface with display device 260 or other auxiliary display associated with computing device 210.

Regardless of the form of API 222, platform component 220 receives commands through API 222 and invokes driver 230 to communicate those commands to display device 260. In reverse, platform component 220 may receive from driver 230 information initiated from display device 260. That information may be a response to a command or may signify an event detected by display device 260 for which it has been programmed to notify one of the gadgets 212A, 212B or 212C.

Accordingly, platform component 220 shares an interface with driver 230 through which such information may pass. In the embodiment illustrated, driver 230 is implemented with IOCTL interface 234. With an IOCTL interface, each command, response or other event is represented by IOCTL values. The IOCTL values communicate the type of command, response or other event and any associated parameters. For example, a command to display information may be represented by an IOCTL value and associated parameters defining the information to display and its format. In contrast, a notification from display device 260 that user input has been received may be represented by a different IOCTL value and may have different parameters identifying the nature of the input and a specific application component for which the input is directed. However, the specific format of the interface between platform component 220 and driver 230 is not critical to the invention and any suitable form of interface may be used. Also, it is not critical that communications to device 260 be in the same form as communications from device 260. For example, a communication from the device may cause driver 230 to post an event to which platform component 220 responds to retrieve information sent by device 260. Such an interface is used in drivers called PnP drivers, as is known in the art, and may alternatively be employed in some embodiments of the invention.

In the embodiment of FIG. 2, driver 230 is implemented with a common component and a transport-specific portion. The common component may provide functions applicable regardless of the specific transport used to communicate with display device 260. The transport-specific portion may be selected based on a specific transport in use.

In the example of FIG. 2, the common portion is provided by common driver component 232. The transport-specific portion is provided by a transport driver, such as one of transport drivers 240A, 240B, 240C and 240D. In some embodiments, a single transport driver may be present to facilitate communication over the specific transport used to link computing device 210 and display device 260. In other embodiments, multiple transport drivers may be present within the operating system of computing device 210. Accordingly, driver 230 may additionally contain one or more sources of information to identify a specific transport driver 240A . . . 240D for use in configuring driver 230 for communication with a specific display device 260.

In the embodiment illustrated, an initialization file (INF) 238 may be associated with driver 230. Initialization files are known in the art and represent a mechanism that may be used to configure driver 230 for communication with display device 260. A property store 240 may also be associated with driver 230. The property store may contain information that may be accessed by common driver component 232 to obtain executable code that implements a selected one of the transport-specific drivers 240A . . . 240D and an identifier that may be used by the common driver component 232 to access the transport-specific driver. In the example of FIG. 2, transport-specific driver 240A has been selected and interfaces with common driver component 232 through an interface 242A. When common driver component 232 sends or receives data over transport 250, it performs these functions by interfacing with transport-specific driver 240A through interface 242A.

In the illustrated embodiment, each of the transport-specific drivers may be implemented as an object according to the common object model (COM). Accordingly, an identifier within store 240 may be a CLSID associated with the specific transport driver, which allows common driver component 232 to interface with any selected transport-specific driver. The information in INF file 238 and store 240 provides a mechanism for common driver component 232 to interface with any of the transport-specific drivers, even if not initially implemented in conjunction with the common driver component. For example, each of the transport-specific devices 240A . . . 240D may have a COM interface, such as interface 242A . . . 242D, which allows common driver component 232 to interface with any selected driver. In this way, a manufacturer of display device 260 may provide a transport-specific driver, in conjunction with information for INF file 238 and store 240, that allows common driver component 232 to interface with display device 260. A transport-specific driver may be readily supplied by an independent hardware vendor (IHV) that provides display device 260 for use in conjunction with computing device 210.

In the embodiment illustrated, the software architecture enables a transport-specific driver to be implemented with simple functionality. In the embodiment illustrated, common driver component 232 may internally process information representing each interaction between an application component and a display device as a data stream. To send a command to display device 260, common driver component 232 writes a data stream to transport-specific driver 240A. Transport-specific driver 240A transmits that data over transport 250 using the format of transport 250 defined for data transmission. No special formatting is required, even though the data stream may represent a command that ultimately changes the content on display 266. For responses or other event notifications generated on display device 260, transport-specific driver 240A needs only receive a data stream over transport 250 and provide the data stream to common driver component 232. Even though the data stream may represent a response or other event notification, transport-specific driver 240A may be a simple driver and does not need to be coded to perform functions based on a specific response or notification received.

Accordingly, the interface between common driver component 232 and transport-specific driver 240A may be a relatively simple interface. In one embodiment, interface 242A may support only a read and a write command. A write command through interface 242A may allow common driver component 232 to convey to display device 260 a data stream representing a command. A read command through interface 242A may allow common driver component 232 to receive a response or other event notification from display device 260.

Common driver component 232 may translate between IOCTL values received through IOCTL interface 234 and data streams provided through interface 242A. Likewise, common driver component 232 may translate between data streams read through interface 242A and IOCTL values provided to platform component 220 through IOCTL interface 234. Any suitable mechanism may be used within common driver components 232 to make these translations between data streams and IOCTL values.

In the embodiment illustrated, such translations may be based on a defined display packet protocol. Interactions between gadgets 212A . . . 212C and display device 260 may be represented by packets. Each packet may have a format defined according to the protocol. The protocol may define one or more fields for each packet. The position of specific bits of information within a data stream may define the field of the packet with which those data bits are associated. In this way, devices operating according to the display packet protocol may either generate or interpret data streams representing packets. An example packet format is given below in conjunction with FIG. 5A and a specific example of a protocol is provided below.

Common driver component 232 may translate between IOCTL values and packets in any suitable way. For example, common driver component may contain a look-up table or other suitable data structure for mapping between IOCTL values and packets. However, the specific mechanism used to translate between IOCTL values and data streams representing packets is not critical to the invention.

A display packet protocol may additionally describe other aspects of communications between application components and a display device. For example, aspects of the display packet protocol may be state based. In such a scenario, the display packet protocol may define allowable state transitions.

In some embodiments, an additional function of common driver component 232 may be to maintain state information to correctly implement state transitions. As one example, communications according to a defined protocol may entail a device receiving a packet to generate an acknowledgement packet. The acknowledgement may indicate either that the packet was successfully received, called an ACK, or that the packet was not successfully received, called an NACK. In this embodiment, common driver component 232 may maintain state information indicating packets transmitted that have not been acknowledged. In response to a NACK related to a packet, common driver component 232 may provide a data stream to transport-specific driver 240A, causing it to retransmit the packet. Alternatively, common driver component 232 may use state information to notify an application component that a specific communication was not successfully completed, allowing the application program to respond appropriately.

As another example, common driver component 232 may use state information to generate a synchronization packet, called a SYNC packet. A SYNC packet may contain data in fields indicating to the recipient device to ignore any partially completed communications. Such a packet, for example, may be useful in which display is transmitted to display device 260 using multiple packets. In such a scenario, common driver component 232 may maintain state information indicating which portions of the data have been transmitted and may sequentially generate packets containing portions of the data until all of the data has been successfully transmitted. If common driver component 232 detects an error in transmission during such a transaction involving multiple packets, common driver component 232 may issue a SYNC packet. Display device 260 may be programmed to respond to a SYNC packet received during a multi-packet transaction by ignoring any packets or portions of packets associated with the multi-packet transaction that it has previously received. Common driver component 232 may then restart transmission of the data.

The specific format of packets used to represent transactions between a computing device 210 and display device 260 is not critical to the invention. However, a specific example of the packets according to an exemplary protocol is provided below.

Regardless of the specific protocol in use, display device 260 may be constructed to receive and generate data streams containing data formatted as packets according to the protocol. In the embodiment illustrated, display device 260 contains a device side transport driver 262. In this embodiment, display device 260 may be specifically constructed to operate over transport 250. Accordingly, a single device side transport driver 262 is illustrated. However, the number and type of transports over which device 260 may operate is not a limitation on the invention. Accordingly, display device 260 may contain one or more device side transport drivers, though a single device side transport driver 262 is shown for simplicity.

As with transport-specific driver 242A, device side transport driver 262 may be configured to send and receive data streams over transport 250. In the embodiment illustrated, each of the data streams received is provided as a packet to Endpoint 264. Endpoint 264 represents a software component that controls functioning of display device 260. The specific functions performed by Endpoint 264 may depend on the nature of display device 260. However, in the embodiment illustrated, Endpoint 264 receives data streams representing packets defining commands and alters display 266 in response to those commands.

Additionally, Endpoint 264 may generate data streams using the packet format for responses to commands executed by Endpoint 264. Endpoint 264 may provide such data streams to device side transport driver 262 for communication over transport 250. Within computing device 210, such data streams may be received through transport-specific driver 240A and read by common driver component 232 through interface 242A. As described, common driver component 232 may process those received data streams so that the responses are provided to the appropriate gadgets 212A . . . 212C.

Additionally, endpoint 264 may receive user input or other indications of events associated with display device 260. In response, endpoint 264 may generate data streams formatted as packets representing event notifications. Those data streams may similarly be conveyed over transport 250 for processing within common driver component 232.

Endpoint 264 otherwise may perform functions that support communication according to the defined display packet protocol. In embodiments in which display device 260 receives acknowledgements of packets it sends or may initiate multi-packet transactions, endpoint 264 may maintain state information similar to common driver component 232. Endpoint 264 may respond to ACK and NACK packets in the same way as common driver component 232. Additionally, if display device 260 may initiate multi-packet transactions, endpoint 264 may issue SYNC packets in the same way as common driver component 232.

It should be appreciated that FIG. 2 illustrates one embodiment of partitioning of software that performs functions associated with communications between application components and an auxiliary display device. Any suitable partitioning of functions may be used. For example, the functions attributed to device side transport driver and endpoint 264 may be performed in a single component. Similarly, functions associated with endpoint 264 may alternatively be implemented in device side transport driver 262 and vice versa.

Regardless of the specific implementation of the software components, the components may interact to perform a process 300 (FIG. 3) of sending a command to a display device. Process 300 begins at block 310 where a gadget initiates a command to the display device. The nature of the command initiated by a gadget may depend on the function implemented by the gadget. In the example in which an auxiliary display is used to depict reminders of upcoming events, the gadget may initiate a command to cause text describing an upcoming event to be presented on the display. However, by facilitating the integration of auxiliary displays with computing devices, many functions may be implemented using auxiliary displays. For example, an auxiliary display may present information depicting controls for an audio visual device. As one example, a command initiated at block 310 may indicate to a display device to present a volume control or volume level information to a user.

Figure 3:
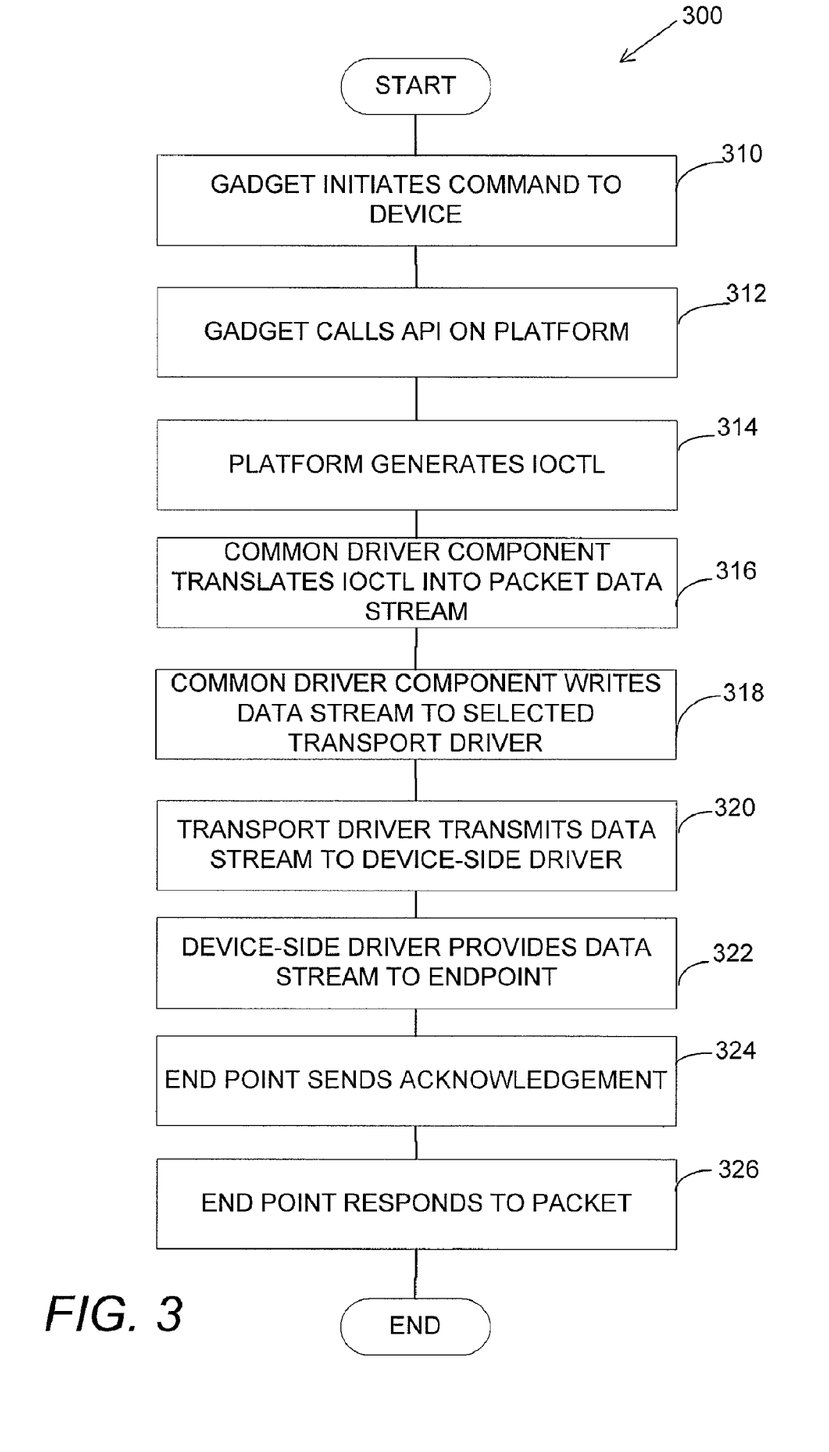
FIG. 3 is a flowchart of a process for sending a command to an auxiliary display device according to an embodiment of the invention.

Regardless of the nature of the command initiated at block 310, processing may proceed to block 312. At block 312, the gadget may call platform component 220 through API 222 to initiate transmission of the command to the display device.

At block 314, platform component 220 may generate IOCTL values representing the command and any relevant parameters. These IOCTL values may be passed to common driver component 232 through IOCTL interface 234. Upon receipt of the IOCTL values, common driver component 232 may generate a packet with fields according to a defined packet protocol. The IOCTL values received by common driver component 232 may be translated to specific values in the fields of the packet. This packet may then be represented as one or more data streams as a result of processing at block 316.

At block 318, the common driver component may write the data stream or streams generated at block 316 to a transport-specific driver. The transport-specific driver may be selected to match the transport used to communicate with the display device. In the embodiment illustrated in FIG. 2, a transport-specific driver is selected by instantiating a COM object based on information in INF file 238 and store 240. Regardless of the specific transport driver 240A . . . 240D used, the driver will present a corresponding interface 242A . . . 242D, respectively, to common driver component 232. Because each of the transport-specific drivers is encoded to implement the same COM interface, upon writing to that interface at block 318, the write command will be directed to the selected transport-specific driver. However, any suitable mechanism may be used for selecting a transport-specific driver at block 318 and providing a data stream to it.

The process continues to block 320 where the transport-specific driver transmits the data stream to device side transport driver 262 using transport 250. In the embodiment illustrated, the data stream is formatted for communication according to the protocol used by transport 250. At block 322, the device side driver provides the data stream to endpoint 264. At block 324, the endpoint sends an acknowledgement, indicating that it received the packet. Thereafter, at block 326, the endpoint performs processing in accordance with the command indicated in the packet.

Figure 4:
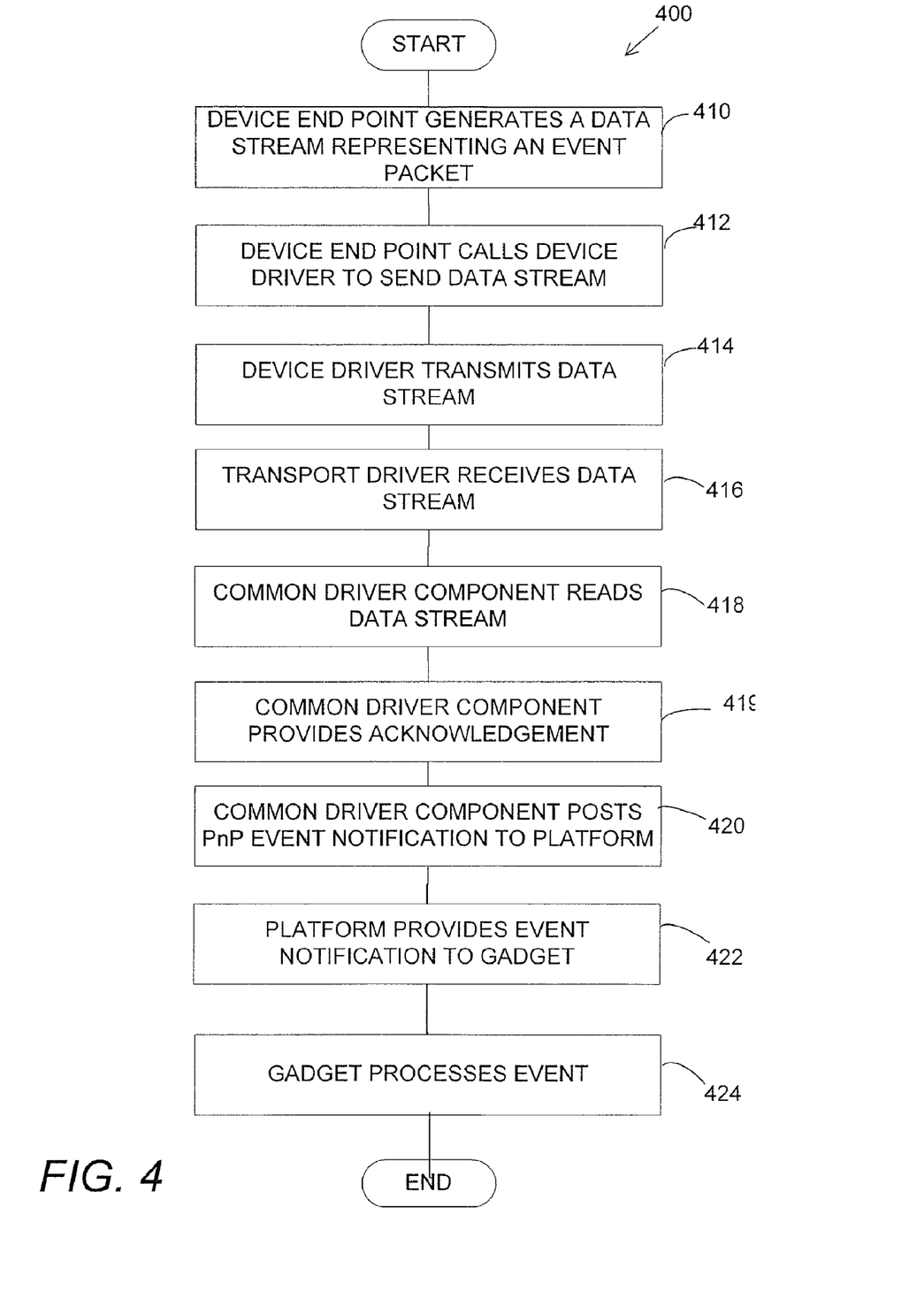
FIG. 4 is a flowchart of a process of receiving display-related information from an auxiliary display device according to an embodiment of the invention.

FIG. 4 illustrates a similar process 400 that may be performed to allow a display device to communicate a notification of an event. A similar process may be used to enable communication of a response to a command. In the example illustrated, process 400 begins at block 410. At block 410, an endpoint on the display device generates a data stream representing an event packet. The event packet may contain information indicating that a user has provided input associated with a segment of a display 266 assigned to a specific application component, such as gadget 212A. Accordingly, processing at block 410 may entail generating a packet indicating that user input was received. The data in the packet may also indicate the specific input received and may indicate that the input is directed for gadget 212A, or other application components. However, the specific nature of the event described in the data stream in not critical to the invention, and in accordance with embodiments of the invention, a protocol may be defined allowing any suitable event to be represented by a data stream.

Regardless of the nature of the event represented in a data stream, processing proceeds to block 412, where endpoint 264 calls a device side driver to send the data stream. At block 414, the device side driver transmits the data stream over transport 250. Communication over transport 250 may be in accordance with a known protocol for transport 250, with the data stream represented as data associated with a transmission over transport 250.

At block 416, the transport-specific driver 240A within computing device 210 receives the transmission over transport 250. At block 418, common driver component 232 reads the data stream from transport-specific driver 240A through interface 242A. Any suitable mechanism may be used to trigger common driver component 232 to read the data through interface 242A. For example, common driver component 232A may poll interface 242A to determine whether transport-specific driver 240A has received data. Alternatively, transport-specific driver 240A may use a notification scheme to indicate to common driver component 232 that it has received data. Such a notification scheme may be implemented as is known in the art or in any other suitable way.

At block 419, common driver component 232 generates an appropriate acknowledgement message. In scenarios in which the received data stream can be correctly formatted as a packet according to the protocol in use for communications between computing device 210 and display device 260, common driver component 232 sends an ACK. In scenarios in which the data stream received does not represent a valid packet, common driver component 232 may send a NACK, and the process of FIG. 400 may terminate or otherwise be diverted to an error handling routine.

Once common driver component 232 has successfully read the data stream, common driver component 232 creates values representing the event described in the data stream. The common driver component creates a PnP Event rather than an IOCTI here. See updated FIG. 4 block 420. At block 420, common driver component 232 creates a PnP event, platform component 220 to obtain the values representing the event. At block 422, platform component 220 provides notification of an event to a gadget targeted by the event notification. The notification may be provided through API 222 using a format as is known in the art. However, any suitable mechanism may be used to convey an event notification to a gadget or other application component.

Regardless of the specific mechanism used to notify the gadget of the event, the gadget processes the event at block 424. Processing at block 424 may be in any suitable form and may depend on the nature of the event notification.

Figure 5A:
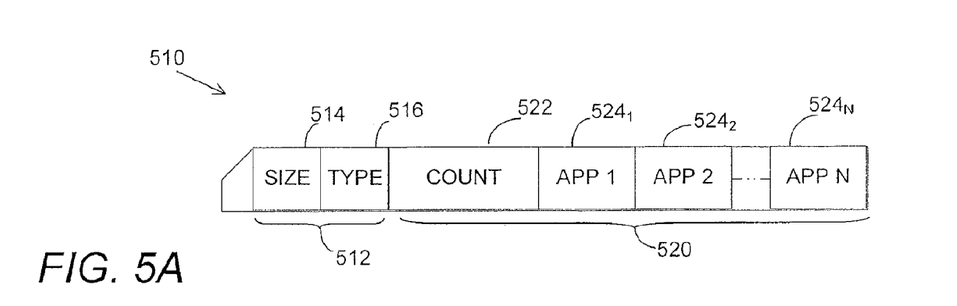
FIG. 5A is a sketch of a packet of display related information according to an embodiment of the invention.

In process 300 (FIG. 3) and process 400 (FIG. 4), commands, responses and other event notifications are represented as packets according to a defined protocol. Any suitable packet format may be used in protocols according to embodiments of the invention. FIG. 5A illustrates a packet 510 with a format according to an embodiment of the invention. In the example illustrated, packet 510 includes a header 512 and a data portion 520. In the example illustrated, header 512 contains two fields, fields 514 and 516. Field 514 contains data indicating the size of the packet. In the described embodiment, each packet, regardless of type, has a header of a fixed size. Accordingly, the value in field 514 may indicate the size of only data portion 520. However, any suitable encoding may be used for values within field 514.

Field 516 includes a value defining a packet type. The type associated with a packet may signify actions to be taken by the device receiving the packet. The type may, for example, identify the packet as a command, a response or an event notification.

Different types of packets may have different numbers and sizes of fields associated with them. Packet 510 is shown to have multiple data fields 522 and $524_1, 524_2 \ldots 524_N$. In this example, packet 510 represents a response that may be generated by a display device processing a "get application order" command. Accordingly, the values in fields 522 and $524_1, 524_2 \ldots 524_N$ convey information about applications and the order of those applications recognized by the display device. For example, FIG. 2 illustrates multiple gadgets 212A . . . 212C, each of which may communicate with display device 260. Display device 260 may track gadgets with which it is in communication so that it may direct notifications of events to the appropriate gadget. Additionally, the display device may maintain an order of application components which may be used in controlling the configuration of information on the display. For example, when multiple application components generate information for display, the display device may layer the information in accordance with the order of the devices resulting in information generated by higher order devices being overlaid on information generated by lower order devices. Packet 510 may also identify an order associated with applications.

In this example, field 522 contains a value indicating the total number of applications that have been added to the device. In the example illustrated, N applications have been added to the device. Accordingly, N fields $524_1, 524_2 \ldots 524_N$ are included within packet 510. Each of the fields $524_1, 524_2 \ldots 524_N$ identifies, using a unique identifier, one of the applications added to the device. The applications may be identified in these fields in accordance with their order.

Packet 510 has a data portion 520 representing one type of packet. Other types of packets may have data portions with different numbers of fields containing information appropriate for other types of packets. In some embodiments, each packet, regardless of type, will have a header with fields as indicated in header 512. However, packets may be formatted in any suitable way.

Figure 5B:
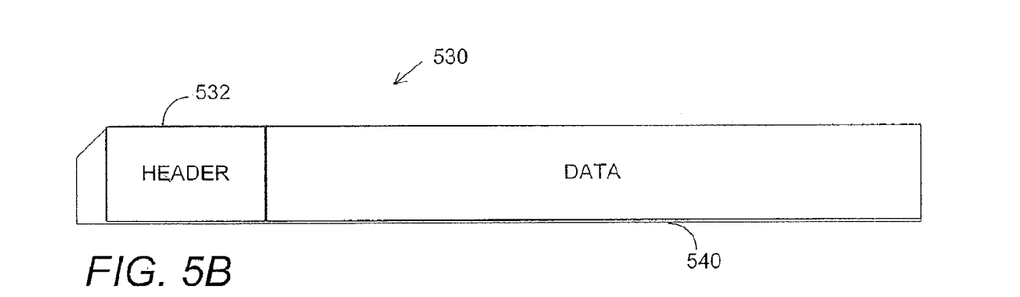
FIG. 5B is a sketch of an information format supported by a transport.

Regardless of the format of the packets used to communicate display information, the packets may be communicated over a transport. Communications over a transport may be in accordance with the protocol defined for the transport. FIG. 5B illustrates a transport packet 530 as an example of a format that may be used for communications over a transport. In this example, transport packet 530 includes a header 532 and a data portion 540. Header 532 may be in a format defined by the specific transport. Accordingly, a TCP/IP transport has a header in a different form than a packet communicated over a Bluetooth or USB transport. Likewise, transport packets formatted for different transports may have different size data portions. However, regardless of the size of data portion 540, the data portion may accommodate a stream of data.

Figure 5C:
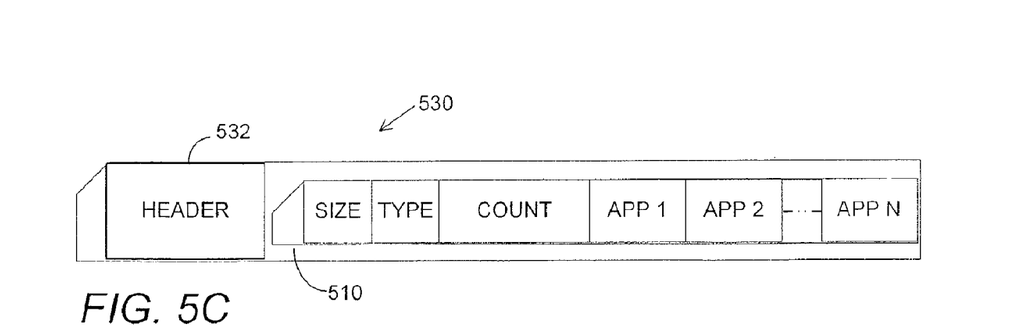
FIG. 5C is a sketch of a display packet communicated over a transport according to an embodiment of the invention.

Regardless of the specific format for communications over a transport used to interconnect a computing device with a display device, FIG. 5C illustrates that the transport may be used to communicate display information. In FIG. 5C, a display packet, such as packet 510 has been encapsulated in transport packet 530. Display packet 510 is encapsulated in transport packet 530 by representing display packet 510 as a data stream stored in the data portion 540 of transport 530. However, any suitable mechanism may be used to encapsulate display packet 510 for communication over a transport.

Example Protocol

The following provides a specification for packets according to an example packet protocol. In this example, packets conveying display information are referred to as "SideShow" packets.

In the example below, packet types are defined. The packet types collectively supported by the protocol represent the types of commands, responses and notifications supported by the protocol. In the embodiment of FIG. 2, API 222 may be configured to support communication of each of these commands, responses or notifications. Similarly, IOCTL interface 234 may be configured to support each type of command, response or notification.

Packet Header

All packets have a common header that contains the packet type, a packet number and the size of the packet:

```
/////////////////////////////////////////////////////////
// Base packet header, shared by all packets send between host and
// device, in both directions.
/////////////////////////////////////////////////////////
struct SideShowPacket
{
    DWORD      m_Size;      // 4 bytes
    PacketType m_Type;      // 4 bytes
    USHORT     m_Number;    // 2 bytes
protected:
    SideShowHeader (SideShowPacketType apt, DWORD size,
USHORT number): m_Size(size), m_Type(apt), m_Number(number)
{ }
};
```

Packet Types

Each type of SideShow packet is assigned a packet type number. The packet header contains this number. Packet numbers are a four byte value where the high byte is a bitfield that indicates response packets. The bitfield is defined as:

```
// The packet type is a 4 byte value where the high
byte is reserved for
// control data.
//
//       Packet type high bite bit field:
//          7  6  5  4  3  2  1  0
//       -----------------------------------
//       |  |  |  |  |  |  |  |  |
//       -----------------------------------
//             |  |  \----------------------/
// Response (1) ---   |          |
//                    |          |
// NACK (1)/ACK -----            |
//                               |
// Error Code -------------------
//
```

Bit seven is set if this packet is a response packet to a command. Bit six is set if the response is a NACK, or cleared if the response is an ACK. Bits five through zero contain an error code if bit six was set.

The packet type numbers are defined in an enumerated type:

```
//
// This enum defines the packet types for the protocol.
//
enum PacketType
{
    //
    // Protocol control packets.
    //
    Ping 1,
    SetUserState,
    SetCurrentUser,
    GetCurrentUser,
    GetDeviceFirmwareVersion,
    GetCapabilities,
    GetApplicationOrder,
    SetApplicationOrder,
    SetLanguage,
    GetPreEnabledApplications,
    SetTime,
    SetShortDateFormat,
    SetLongDateFormat,
    SetShortTimeFormat,
    SetLongTimeFormat,
    AddApp,
    DeleteApp,
    DeleteAllApps,
    AddNotification,
    DeleteNotification,
    DelteAllNotifications,
    SetNotificationsEnabled,
    AddContentItem,
    DeleteContentItem,
    DeleteAllContentItems,
    GetSupportedEndpoints,
    SetTimeZone,
    GetDeviceName,
    GetDeviceManufacturer,
    //
    // Eventing packets, originating from the Device
    //
    ContentMissingEvent,
    ApplicationEvent,
    ChangeUserEvent
};
```

Response Packets

Return packets are sent in response to command packets and event packets. Response packets are either ACKs or NACKs. A well-formed response packet header has the following format:

Packet Number: Is set to the same packet number of the command packet that is being responded to. This ensures that the response can be matched correctly with the command.

Packet Type: Is the same packet type as the command packet that is being responded to. The packet type's high bit is set to indicate that the packet is a response packet.

ACK

An ACK response packet is a positive response packet and is specified by clearing bit six of the high byte of the Packet Type portion of the packet header. Some response packets that are ACKs may also contain data that was requested by the command. The specifics of what data is sent in response to what commands is specified in the description for the Command packets.

NACK

A NACK response packet is a negative response packet and is specified by setting bit six of the high byte of the Packet Type portion of the packet header. In addition, bits five through zero contain an error code for the failure of the command that is being responded to.

Command Packets

Command packets represent the operations that the SideShow platform is requesting of the device. Command packets are initiated by the computing device for communication to the display device driver. Command packets can be composed of several pieces of data that constitute arguments for the command. String arguments contained within packets are composed of a four byte value that indicates the length (in bytes) of the string (including NULL terminator), followed by the string data. Strings are by convention NULL terminated. Buffer arguments contained within packets are formatted like strings; a four byte value that indicates the length followed by the buffer data. For every command, a response packet is returned by the device. Response packets are packets with the response bit set on the Packet Type in the header, and contain the same packet number as the command. The response packet is either:

An ACK that indicates success of the command. The ACK response may contain optional data (described in the individual commands); or A NACK packet that indicates that the command failed.

1. Set User State

Notifies assigned-mode devices which users are available to be selected as the owner of the device.

Data

The following fields may appear in the packet:

Header, size+type+number=10 bytes

Changed User SID, <string>

Domain, <string>

User state, <DWORD>.

Changed User SID

The SID of the user whose state is changing.

Domain

The domain of the changed user

User State

```
typedef enum tagUSER_STATE
{
    AVAILABLE   = 0,
    UNAVAILABLE = 1,
} USER_STATE;
```

A USER_STATE that indicates the user's current state. Possible values are: AVAILABLE, UNAVAILABLE Return Packet

ACK

2. Set Current User

Sets the current user of a device.

Data

The following fields may appear in the packet:

Header, size+type+number=10 bytes

User SID, <string>

User SID

The SID of the new user of the device.

Return Packet

ACK

3. Get Current User

Retrieves the current user of a device.

Data

The following fields may appear in the packet:

Header, size+type+number=10 bytes

Return Packet

Return Current User

Header, size+type+number=10 bytes

User SID, <string>

User SID

The SID of the current user of a device.

4. Get Device Firmware Version

Retrieves a string that identifies the version of the device firmware.

Data

The following fields may appear in the packet:

Header, size+type+number=10 bytes

Return Packet

Data

The following fields may appear in the packet:

Header, size+type+number=10 bytes

Firmware version <string>

Firmware Version

A string that contains the firmware version.

5. Get Capabilities

Data

The following fields may appear in the packet:

Header, size+type+number=10 bytes

Requested capability <PROPERTYKEY>

Requested Capability

The PROPERTYKEY value that indicates the capability to retrieve from a device.

Return Packet

Data The data contained in the response packet is an encoded PROPVARIANT. The supported PROPVARIANT types are: VT_EMPTY, VT_I2, VT_I4, VT_R4, VT_R8, VT_DATE, VT_BOOL, VT_I1, VT_UI1, VT_UI2, VT_UI4, VT_U8, VT_UI8, VT_INT, VT_UINT, VT_LPWSTR, VT_CLSID, VT_UI1|VT_VECTOR.

The PROPVARIANTs are encoded such that the first four bytes are the VARTYPE, and the proceeding bytes are the data. Well-known platform capabilities are defined in WindowsSideShow.h and consist of the following:

SIDESHOW_CAPABILITY_DEVICE_ID // [ VT_LPWSTR ]
SIDESHOW_CAPABILITY_SCREEN_TYPE // [ VT_I4 ]
SIDESHOW_CAPABILITY_SCREEN_WIDTH // [ VT_UI2 ]
SIDESHOW_CAPABILITY_SCREEN_HEIGHT // [ VT_UI2 ]
SIDESHOW_CAPABILITY_COLOR_DEPTH // [ VT_UI2 ]
SIDESHOW_CAPABILITY_COLOR_TYPE // [ VT_I4 ]
SIDESHOW_CAPABILITY_DATA_CACHE // [ VT_BOOL ]
SIDESHOW_CAPABILITY_SUPPORTED_LANGUAGES // [ VT_LPWSTR ]
SIDESHOW_CAPABILITY_CURRENT_LANGUAGE // [ VT_LPWSTR ]
SIDESHOW_CAPABILITY_SUPPORTED_THEMES

-continued

```
// [ VT_LPWSTR ]
SIDESHOW_CAPABILITY_CLIENT_AREA_WIDTH // [ VT_UI2 ]
SIDESHOW_CAPABILITY_CLIENT_AREA_HEIGHT // [ VT_UI2 ]
```

The driver can optionally support additional capabilities as required.

6. Get Application Order

Retrieves a list of applications (gadgets) that have been added to a device.

Data

The following fields may appear in the packet:
Header, size+type+number=10 bytes
Return Packet
Data
The following fields may appear in the packet:
Header, size+type+number=10 bytes
Count of Applications <DWORD>
Applications <n*GUID(128 bits)>

7. Set Application Order

Sets the order that the applications are displayed on the device.

Data

The following fields may appear in the packet:
Header, size+type+number=10 bytes
Count of Applications <DWORD>
Applications <n*GUID(128 bits)>
Count of Applications
The number of applications in the list of applications that will follow.
Application IDs
A sequence of Application IDs, where each is a 128 bit GUID.
Return Packet
ACK 8. Set Language Sets the current language on a device.

Data

The following fields may appear in the packet:
Header, size+type+number=10 bytes
Culture code, <string>
Culture Code
A string that identifies that language and culture for the device (i.e. EN-US).
Return Packet
ACK 9. Get Pre-enabled Applications Retrieves the list of applications that a device enabled by default for all users of a computer, if those applications are installed.

The following fields may appear in the packet:
Header, size+type+number=10 bytes
Return Packet
Data
The following fields may appear in the packet:
Header, size+type+number=10 bytes
Count of Applications <DWORD>
Applications <n*GUID(128 bits)>

10. Set Time

Data

The following fields may appear in the packet:
Header, size+type+number=10 bytes
time, <FILETIME>
Time
A FILETIME that is the current time, specified in universal time.

Return Packet
ACK

11. Set Short Date Format

A NULL-terminated string that indicates the format of the date. For more information about the contents of the string, see "Day, Month, Year, and Era Format Pictures" in the Microsoft Windows SDK documentation.

Data

The following fields may appear in the packet:
Header, size+type+number=10 bytes
Short date format, <string>
Return Packet
ACK 12. Set Long Date Format A NULL-terminated string that indicates the format of the date. For more information about the contents of the string, see "Day, Month, Year, and Era Format Pictures" in the Microsoft Windows SDK documentation.

Data

The following fields may appear in the packet:
Header, size+type+number=10 bytes
Long date form <string>
Return Packet
ACK 13. Add Application Adds a new application to be displayed on a device.

Data

The following fields may appear in the packet:
Header, size+type+number=10 bytes
Application ID <GUID(128 bits)>
Endpoint ID <GUID(128 bits)>
Application name, <string>
Cache policy <DWORD>
On-line only, <DWORD>
Large Icon <buffer>
Medium Icon <buffer>
Small Icon <buffer>
Application ID
The Application ID of the gadget to be added.
Endpoint ID
The endpoint that the added application uses.
Application Name
The name of the application, as it will be displayed on a device.
Cache Policy
The caching algorithm requested by the added application.
On-Line Only
A 32-bit value Boolean value that indicates whether the application is an on-line application. An on-line-only application is an application that is functional only when the computer is in the S0 power state.
Large Icon
The data for the application's large size icon. The image is a 32 bit bitmap.
Medium Icon
The data for the application's medium size icon. The image is a 32 bit bitmap.
Small Icon
The data for the application's small size icon. The image is a 32 bit bitmap.
Return Packet
ACK 14. Delete Application Data The following fields may appear in the packet:
Header, size+type+number=10 bytes
Application ID <GUID(128 bits)>

Application ID

The Application ID of the gadget to be removed from a device.

Return Packet

ACK

15. Delete All Applications

Removes all the previously added applications from the device, the content for the applications, and their notifications.

Data

The following fields may appear in the packet:

Header, size+type+number=10 bytes

Return Packet

ACK

16. Add Notification

Data

The following fields may appear in the packet:

Header, size+type+numbe=10 bytes

Application ID <GUID(128 bits)>

Notification ID <DWORD>

Expiration time, <FILETIME>

Title <string>

Message <string>

Image, <buffers>

Application ID

The application identifier that is associated with the added notification.

Notification ID

The notification identifier that is associated with the notification.

Expiration time

A FILETIME structure that contains the date and time that indicates when the notification should expire. For more information about FILETIME, see the Microsoft Windows SDK documentation.

Title

A NULL-terminated string that indicates the title of the notification.

Message

A NULL-terminated string that indicates the text of the notification message.

Image

An image that can be displayed with the notification. The image is a 32 bit bitmap.

Return Packet

ACK

17. Delete Notification

Removes a notification from a device that is associated with either specified application.

Data

The following fields may appear in the packet:

Header, size+type+number=10 bytes

Application ID <GUID(128 bits)>

Notification ID, <DWORD>

Application ID

The application identifier that is associated with the notification to be removed.

Notification ID

The notification identifier that is associated with the notification to be removed.

Return Packet

ACK

18. Delete All Notifications

Removes all notifications from a device that is associated with the specified application.

Data

The following fields may appear in the packet:

Header, size+type+number=10 bytes

Application ID <GUID(128 bits)>

Application ID

The application identifier for which all notifications will be removed.

Return Packet

ACK

19. Add Content Item

Adds content to the device that is associated with the specified application-endpoint pair.

Data

The following fields may appear in the packet:

Header, size+type+number=10 bytes

Application ID <GUID(128 bits)>

Endpoint ID <GUID(128 bits)>

Content ID, <DWORD>

Content data <buffer

Application ID

The application identifier that is associated with the added content.

Endpoint ID

The endpoint that the application uses.

Content ID

The content ID for the item to be added.

Content Data

A buffer that is the data that composes the added content.

Return Packet

ACK

20. Delete Content Item

Removes content from the device that is associated with the specified application-endpoint pair.

Data

The following fields may appear in the packet:

Header, size+type+number=10 bytes

Application ID <GUID(128 bits)>

Endpoint ID <GUID(128 bits)>

Content ID, <DWORD>

Application ID

The application identifier that is associated with the removed content.

Endpoint ID

The endpoint that the application uses.

Content ID

The content ID for the item to be removed.

Return Packet

ACK

21. Delete All Content Items

Removes all content from the device that is associated with the specified application-endpoint pair.

Data

The following fields may appear in the packet:

Header, size+type+number=10 bytes

Application ID <GUID(128 bits)>

Endpoint ID <GUID(128 bits)>

Application ID

The application identifier that is associated with the removed content.

Endpoint ID

The endpoint that the application uses.

Return Packet

ACK

22. Get Supported Endpoints
   Retrieves the list of endpoints that a device supports.
   Data
   The following fields may appear in the packet:
   Header, size+type+number=10 bytes
   Return Packet
   Return Supported Endpoints
   Data
   The following fields may appear in the packet:
   Header, size+type+number=10 bytes
   Count of Application-Endpoint Paris, <DWORD>
   Applications <n*GUID(128 bits)>
   Endpoints <n*GUID(128 bits)>
23. Set Time Zone
   Sets the current time zone on a device.
   Data
   The following fields may appear in the packet:
   Header, size+type+number=10 bytes
   Bias <LONG>
   Standard Date <SYSTEMTIME>
   Standard Bias <LONG>
   Daylight Date <SYSTEMTIME>
   Daylight bias <LONG>
   See "TIME_ZONE_INFORMATION" in the Microsoft Windows SDK for more information about Time zones.
   Return Packet
   ACK Event Packets
   Event packets represent events that the device wants the Windows SideShow platform to be aware of. Event packets are always initiated by the device and sent to the driver.
1. Content Missing
   Contains an event sent by an application on the device.
   Data
   The following fields may appear in the packet:
   Header, size+type+number=10 bytes
   Application ID <GUID(128 bits)>
   Endpoint ID <GUID(128 bits)>
   Content ID, <DWORD>
   Application ID
   The Application ID(GUID) of the gadget that raised the event.
   Endpoint ID
   The endpoint(GUID) of the application that raised the event.
   Content ID
   The content ID of the item that a device is requesting of the gadget.
   Return Packet
   ACK
2. Application Event
   Contains an event sent by an application on the device. The data is determined by the application and the event identifier.
   Data
   The following fields may appear in the packet:
   Header, size+type+number=10 bytes
   Application ID <GUID(128 bits)>
   Endpoint ID <GUID(128 bits)>
   Event ID, <DWORD>
   Event data <buffer
   Application ID
   The Application ID(GUID) of the gadget that raised the event.
   Endpoint ID
   The endpoint(GUID) of the application that raised the event.
   Event ID
   The endpoint-specific event identifier code.
   Event Data
   The data of the endpoint specific event.
   Return Packet
   ACK
3. User Change Request Event
   Used by the device to request that a new available user take ownership of the device.
   Data
   The following fields may appear in the packet:
   Header, size+type+number=10 bytes
   USER SID, <string>
   User SID
   The SID of the user that the device is requesting to take ownership as the current user of the device.
   Return Packet
   ACK

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer storage medium having computer-executable components for execution on a computing device interfaced to an auxiliary display device over a transport, the components comprising:
    at least one application component for providing content for display on the auxiliary display device or receiving user input in response to information on the auxiliary display device;
    a platform component, the platform component comprising an interface adapted to interface to the at least one application component, the platform component adapted to translate information between a defined packet format and a format of the interface;
    a driver component, the driver component adapted to control the transport to communicate between the computing device and the auxiliary display device a data stream representing a packet in the defined packet format, the driver component further comprising:
        a common driver component that provides a driver interface to the platform component, the driver interface adapted to exchange the packet in the defined packet format between the driver component and the platform component, the packet in the defined packet format comprising one or more commands to control the operation of the auxiliary display device;
        a transport-specific driver component that is selected by the common driver component from a plurality of transport-specific driver components, wherein the selected transport-specific driver component corresponds to a device-side transport driver of the auxiliary display device, conveys the data stream representing the packet in the defined packet format between the common driver component and the transport; and controls the transport to send the data stream over the transport to the device-side transport driver of the auxiliary display device.

2. The computer storage medium of claim 1, wherein the plurality of transport-specific driver components comprises a first transport-specific driver component and a second transport-specific driver component.

3. The computer storage medium of claim 2, wherein the first transport-specific driver component comprises a USB driver and the second transport-specific driver component comprises a Bluetooth driver.

4. The computer storage medium of claim 2, wherein:
    the first transport-specific driver component and the second transport-specific driver component each comprise a transport interface implementing read and write functionality; and
    the common driver component interfaces with at least one of the first transport-specific driver component and the second transport-specific driver component through the transport interface.

5. The computer storage medium of claim 4, wherein the transport interface implements only read and write functionality.

6. The computer storage medium of claim 1, wherein the computing device comprises an operating system and the platform component and the driver component comprise a portion of the operating system.

7. A method of operating a computing device to provide a user interface on an auxiliary display device coupled to the computing device over a transport, the method comprising:
generating within an application component a command to control the operation of the auxiliary display device;
generating multiple packets representing the command, the multiple packets formatted as a data stream;
identifying a driver, wherein the driver comprises a common component and a transport-specific component selected from a plurality of transport-specific driver components, wherein the selected transport-specific driver component corresponds to a device-side transport driver of the auxiliary display device, and wherein the selecting of the transport-specific driver component from the plurality of transport-specific driver components comprises reading a value identifying the transport-specific driver component from an initialization file associated with the common component of the driver;
encapsulating the data stream in a format of the transport, wherein the encapsulating the data stream in the format of the transport comprises encapsulating the data stream in the driver;
receiving the multiple packets at the driver from the platform component through an interfaces
transmitting the data stream to the auxiliary display device over the transport
detecting an error in transmitting the multiple packets of the data stream; and
issuing a sync packet to the auxiliary display device that restarts transmission of the multiple packets of the data stream to the auxiliary display device.

8. The method of claim 7, further comprising receiving an acknowledgement in response to the transmitted data stream.

9. The method of claim 8, wherein receiving an acknowledgement comprises receiving a second data stream over the transport and formatting the second data stream as a second packet.

10. The method of claim 7, wherein generating the multiple packets comprises generating the multiple packets within a platform component having an application programming interface, and the method comprises, prior to generating the multiple packets, receiving the command at the platform component through the application programming interface.

11. The method of claim 7, wherein the transport-specific driver component is implemented as an object formatted in accordance with the Common Object Model (COM) and the method further comprises receiving the data stream at the transport-specific driver component through a COM interface.

12. A computing system comprising:
a unit with a processor comprising a driver component and a platform component; and
a computer storage medium having computer-executable instructions for execution by the processor, the computer-executable instructions, when executed, for:
receiving by the driver component over a transport a data stream representing a display packet reported by an auxiliary display device, the display packet communicating a response to one or more commands to control the operation of the auxiliary display device and being encapsulated within a transport packet of the type used by the transport to convey data, and the driver component comprising:
a transport-specific driver component selected from a plurality of transport-specific driver components, wherein the selected transport-specific driver component corresponds to a device-side transport driver of the auxiliary display, and the selected transport-specific driver component is further adapted to convey the data stream representing the display packet between the transport and a common driver component; and
the common driver component providing a driver interface to the platform component, the driver interface adapted to exchange information between the driver component and the platform component, the exchanged information representing the display packet, wherein the common driver component reads the data stream from the transport-specific driver component;
determining one or more input/output control (IOCTL) values representing the display packet;
providing the one or more IOCTL values to the platform component; and
communicating, by the platform component, information representative of the event, the information being communicated to an application component through a programming interface.

13. The computing system of claim 12, wherein the transport comprises at least one of a TCP/IP transport, a Bluetooth transport or a Universal Serial Bus (USB) transport.

14. The computing system of claim 13, wherein the auxiliary display device comprises a first display and the computing system comprises a second display.

15. The computing system of claim 12, wherein:
the computer-executable instructions for determining one or more IOCTL values comprises the common driver component adapted to interface to the plurality of transport-specific device drivers.

16. The computer system of claim 15, wherein the computer-storage medium further comprises at least one initialization file identifying the transport-specific device driver.

* * * * *